E. P. Colburn,
Paddle Wheel.

Nº 56,713.   Patented July 31, 1866.

Witnesses
Samuel N Piper
George Andrews

Inventor
Elisha P. Colburn
by his Attorney
R. M. Eady

UNITED STATES PATENT OFFICE.

ELISHA T. COLBURN, OF BOSTON, MASSACHUSETTS.

IMPROVED PADDLE-WHEEL.

Specification forming part of Letters Patent No. 56,713, dated July 31, 1866.

*To all whom it may concern:*

Be it known that I, ELISHA T. COLBURN, of Boston, in the county of Suffolk and State of Massachusetts, have made a new and useful invention or improvement having reference to paddle-wheels provided with feathering-paddles of the kind hereinafter described; and I do hereby declare the same to be fully described in the following specification, and represented in the accompanying drawings, of which—

Figure 1:
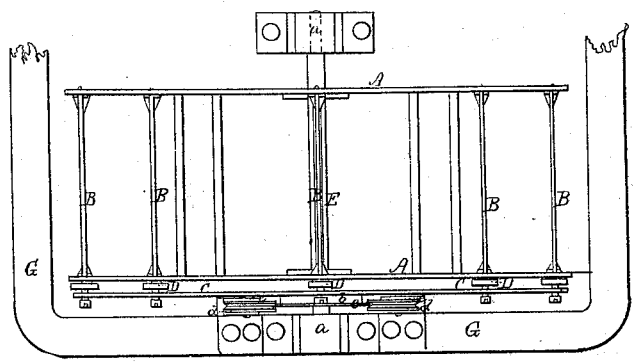
Figure 2:
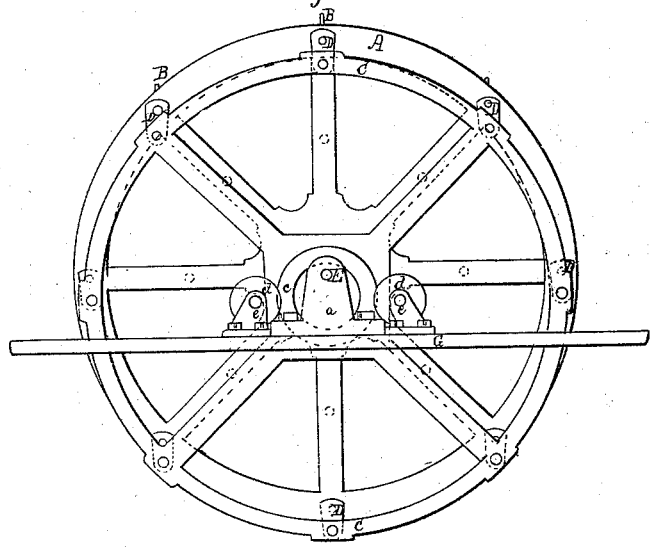
Figure 3:
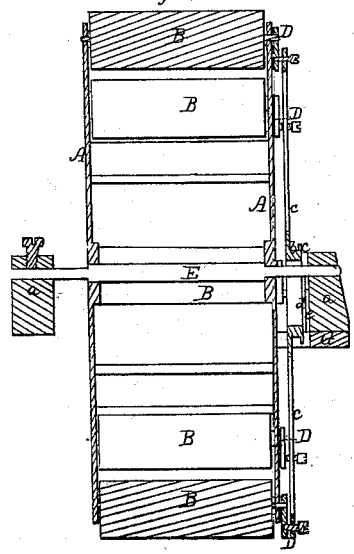

Figure 1 is a top view, Fig. 2 a side elevation, and Fig. 3 a transverse section, of a paddle-wheel provided with my invention.

The paddle-wheel to which my improvement is applicable is composed not only of two heads or wheels, A A, a series of revolving paddles, B B B, whose journals are supported in and by the rims of such heads or wheels, but of a wheel, C, connected with each paddle, or a journal thereof, by means of one of a series of cranks, D D D.

The cranks, as well as the paddles, stand in vertical planes, so that each of the paddles in passing into, through, and out of the water while the propeller may be in use maintains its verticality. The wrist of each crank turns in the wheel C.

The purpose of my invention is to support the said wheel C, or keep it from moving laterally, while it and the system of paddles and the heads A A are in revolution simultaneously. The said heads A A are secured to a shaft, E, whose journals are supported in suitable boxes $a$ $a$, which are to be upheld by the frame and guard G of a vessel when the propeller may be in use.

There is applied to the hub $b$ of the wheel C an annular flange or auxiliary wheel, $c$, which is fastened to the hub, and is arranged between and against the peripheries of the wheels $d$ $d$, permanently supported in boxes or standards $e$ $e$, projecting upward from the guard G. Each of such wheels $d$ $d$ should be free to revolve on its axis.

I am aware that it is not new to apply wheels to the periphery of the crank-connecting wheel C for supporting the said wheel, and therefore I lay no claim to such. When the supporting-wheels are so arranged they are liable, in cold weather, to be clogged by ice, and they will be caused to revolve so much faster than they would be were they arranged as they are in my improvement that they and their journals soon become seriously worn or damaged.

With the separate guide-wheel $c$, or its equivalent, applied to the hub of the crank-wheel C and to the wheels $d$ $d$, I gain all the necessary support of the crank-wheel with a very slow revolution of the wheels $d$ $d$.

I make no claim to the combination of the wheel $c$ and the guide-wheels $d$ $d$ with the crank-wheel C, when applied to the cranks of a series of paddles, B B B, supported in heads A A, applied to a rotary shaft, as set forth.

My improvement has reference to the arrangement of the wheels $d$ $d$ with respect to the wheel $c$, which is disposed between the wheels $d$ $d$, and with its outer periphery in contact with their circumferences.

This arrangement enables me to employ a much smaller guide-wheel than when the wheels $d$ $d$ are arranged within and so as to bear against the inner periphery of the guide-wheel. My improvement effects not only a material gain in expense of construction, but greatly diminishes the friction of the rubbing-surfaces of the guide-wheel and its bearing-wheel.

I therefore claim—

The improved arrangement of the guide-wheel $c$ and the bearing-wheels $d$ $d$, the latter, under such arrangement, having the wheel $c$ between them, as set forth.

E. T. COLBURN.

Witnesses:
R. H. EDDY,
F. P. HALE, Jr.